May 19, 1970   A. WINKLER ET AL   3,512,465
CAMERA FOR OPERATION IN DAYLIGHT AND ARTIFICIAL LIGHT
Filed April 13, 1967
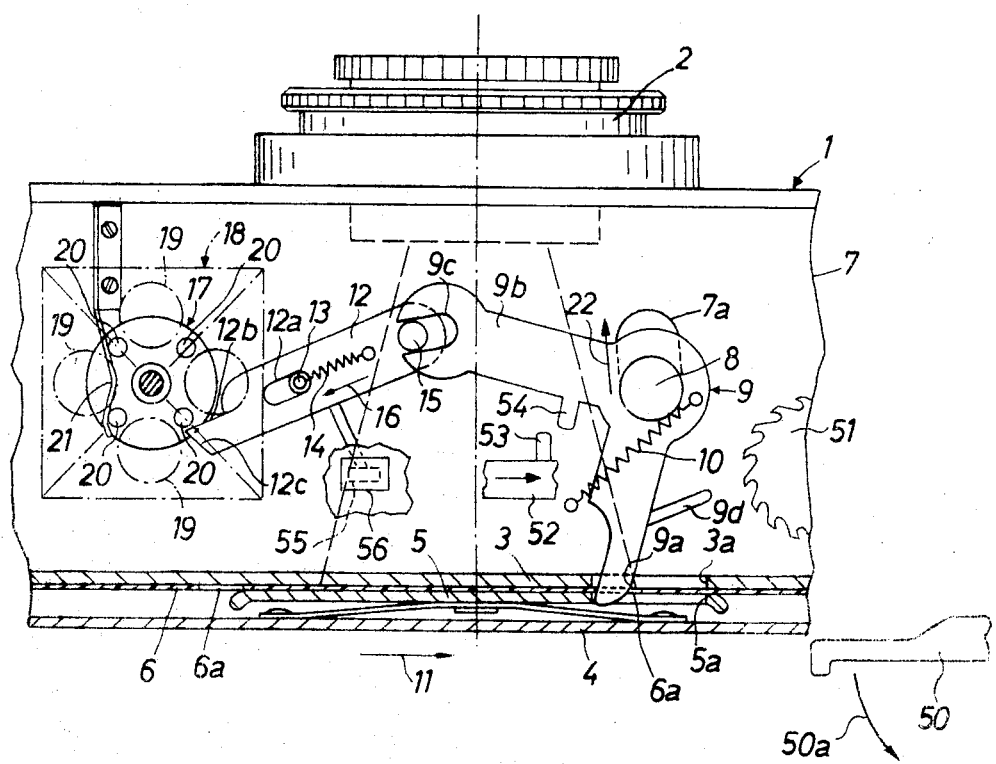
INVENTOR.
ALFRED WINKLER
HEINZ ERNST
BY

United States Patent Office 3,512,465
Patented May 19, 1970

3,512,465
CAMERA FOR OPERATION IN DAYLIGHT AND ARTIFICIAL LIGHT
Alfred Winkler and Heinz Ernst, Munich, Germany, assignors to Agfa-Gevaert Aktiengesellschaft, Leverkusen, Germany
Filed Apr. 13, 1967, Ser. No. 630,639
Claims priority, application Germany, May 12, 1966,
A 52,454
Int. Cl. G03b *19/04*
U.S. Cl. 95—11                           16 Claims

ABSTRACT OF THE DISCLOSURE

A still camera which has a socket for the base of a rotary multiple flash bulb holder and an indexing unit receiving motion directly from the film during operation of the film transporting mechanism to thereby index the multiple flash bulb holder. The holder or the socket is provided with pin-shaped followers which are engaged seriatim by an output member of the indexing unit in response to successive operations of the film transporting mechanism, and the indexing unit includes an input member in the form of an arm provided on a bell crank lever and receivable in successive openings provided in the film at intervals corresponding to distances between the centers of successive film frames. The indexing unit also actuates the frame counter and carries an index or pointer to allow for observation of its position.

Background of the invention

The present invention relates to improvements in photographic cameras for operation in daylight and artificial light. More particularly, the invention relates to improvements in cameras whose flash units may utilize indexible or otherwise movable multiple flash bulb holders, particularly those sold under the name "Flashcube."

It is already known to provide a photographic camera with a rotary socket which can receive the base of a multiple flash bulb holder. The socket can be indexed by hand to thereby place successive flash bulbs into an optimum position for illumination of the subject during an exposure with flash. It is also known to provide a direct connection between the film transporting mechanism and the socket or to provide the socket with a separate motor which changes its angular position in response to actuation of the shutter release trigger. A serious drawback of all such cameras is that the indexing means for the socket occupies too much room, that such indexing means comprises a large number of parts, and that it contributes considerably to the initial cost of the camera.

Accordingly, it is an important object of our invention to provide a novel and improved indexing or motion transmitting unit for multiple flash bulb holders of flash units in photographic cameras and to construct the indexing unit in such a way that it occupies little room and comprises a surprisingly small number of simple parts.

Another object of the invention is to provide an indexing unit of the just outlined characteristics which need not be provided with its own prime mover, which need not be positively coupled to the film transporting mechanism, and which can operate properly irrespectively of the type or mode of operation of the film transporting mechanism.

An additional object of the invention is to provide a photographic camera which embodies the above outlined indexing unit and wherein the position of the multiple flash bulb holder changes automatically without necessitating any attention on the part of the operator.

A concomitant object of the invention is to provide an indexing unit which, in addition to changing the position of a multiple flash bulb holder, can also perform one or more additional important functions in automatic response to customary manipulations of the camera which are necessary preparatory to making an exposure in artificial light.

Summary of the invention

One feature of our invention resides in the provision of a camera, preferably a still camera, which is provided with a customary film transporting mechanism and whose housing carries a socket adapted to receive a multiple flash bulb holder, preferably a so-called "Flashcube" which is indexible about a fixed axis to place successive flash bulbs into an optimum position for illumination of the subject. In accordance with the present invention, the multiple flash bulb holder is indexible or otherwise movable in response to motion transmitted thereto by a motion transmitting or indexing unit whose input member receives motion directly from the film during at least a portion of operation of the film transporting mechanism. The motion transmitting or indexing unit may include a single lever or link train including a series of articulately connected levers one of which constitutes the input member and the other of which constitutes the output member and can engage and turn successive followers provided on the socket or on the base of the multiple flash bulb holder in a distribution corresponding to that of flash bulbs therein.

The motion transmitting or indexing unit preferably also performs one or more additional functions. For example, it can operate a customary frame counter and one of its parts may carry a suitable index which is in registry with a window in the camera housing when the corresponding part assumes a predetermined position. Such predetermined position can indicate that the shutter of the camera is cocked and/or that the film transporting mechanism must be operated prior to making the next exposure.

The novel features which are considered as characteristic of the invention are set forth in particular in the appended claims. The improved camera itself, however, both as to its construction and its mode of operation, together with additional features and advantages thereof, will be best understood upon perusal of the following detailed description of a specific embodiment with reference to the accompanying drawing.

Brief description of the drawing

The single figure is a fragmentary top plan view of a still camera which embodies our invention, a portion of the housing being broken away and certain parts of an indexible multiple flash bulb holder being indicated by phantom lines.

Description of the preferred embodiments

The camera which is shown in the drawing comprises a housing or casing 1 whose front wall carries an objective mount 2. A film platform 3 of the housing 1 is provided with a window which is located in front of and registers with an unexposed film frame when the camera is ready to make an exposure. The rear wall or door 4 of the housing 1 is detachable or pivotable and supports a pressing plate 5. The film path or channel extends between the rear side of the platform 3 and the pressing plate 5, and the film is shown at 6. This film is formed with openings 6a located adjacent to one of its edges and spaced from each other by distances corresponding to the distances between the centers of successive film frames. The platform 3 is formed with a cutout or aperture 3a which registers with a similar cutout or aperture 5a in the pressing plate 5.

The top wall of the housing 1 carries an indexible socket 17 which receives the base of a rotary multiple flash bulb holder 18. This holder resembles a "Flashcube" and comprises four equidistant flash bulbs 19 which are indicated by phantom lines. Each flash bulb 19 is located behind a suitable reflector and the socket 17 is provided with four equidistant pin-shaped followers 20, one for each flash bulb 19. In the illustrated embodiment, the followers 20 alternate with the flash bulbs 19. A detent device is provided to normally hold the socket 17 in an angular position in which one of the flash bulbs 19 assumes a predetermined angular position with reference to the housing 1, namely, an angular position in which it faces the subject which is to be photographed during an exposure. The detent device comprises a suitably bent leaf spring 21 mounted on a fixed bracket and normally engaging two followers 20 to yieldably hold the socket 17 in one of four angular positions. The four angular positions are spaced from each other by 90 degrees. The bracket for the leaf spring 21 is mounted on a horizontal partition 7 in the housing 1, but it is equally possible to mount this bracket on the top or front wall of the housing. The followers 20 can be provided on the base of the multiple flash bulb holder 18, and such base is non-rotatably but removably received in the central aperture of the socket 17.

An important feature of our invention resides in the provision of a motion transmitting or indexing unit which can derive motion directly from the film 6 and serves to index the socket 17 (and hence the multiple flash bulb holder 18) in automatic response to operation of a suitable film transporting mechanism. In its simplest form, the film transporting mechanism may comprise a lever or similar actuating member 50 which is coupled to the reel or core in the takeup cartridge of the camera. The lever 50 can be turned through an angle of such magnitude that the film 6 is transported lengthwise in its path by increments corresponding to distances between successive openings 6a, i.e., to distances between the centers of successive film frames. Of course, it is equally possible to utilize another type of film transporting mechanism, for example, one whose actuating member is contsituted by a knob which rotates one or more sprockets whose teeth enter the customary perforations at the one or both edges of the film 6.

The novel motion transmitting or indexing unit is mounted on the partition 7 and includes a two-armed lever 9 pivotably mounted on the partition 7 in such a way that it can rock about a vertical axis and is also reciprocable in directions substantially at right angles to the film path. The fulcrum for the lever 9 includes a post or pin 8 which is rigid with this lever and extends into an elongated slot 7a provided in the partition 7. The lever 9 is biased in a clockwise direction, as viewed in the drawing, by a helical spring 10 which is attached to the partition 7 and to the input member or arm 9a of the lever 9. The mounting of the spring 10 is such that the free end of the arm 9a is biased into the registering cutouts 3a and 5a; however, the arm 9a can actually enter the cutout 5a only when the latter registers with one of the openings 6a in the film 6. Such registry will take place in response to advance of the film 6 (arrow 11) during operation of the film transporting mechanism including the lever 50. The film transporting mechanism is preferably combined with a suitable blocking device 52 which prevents double exposure of film frames. When an opening 6a travels between the cutouts 3a and 5a, the free end of the arm 9a penetrates therethrough and the lever 9 is thereupon compelled to turn in a counterclockwise direction in response to further advance of the film. Such turning of the lever 9 and simultaneous movement of the film 6 in the direction indicated by arrow 11 causes the free end of the arm 9a to slide along the trailing edge of film in the respective opening 6a and to ultimately move out of the opening so that the lever 9 assumes an end position in which its arm 9a bears against the film 6 and is prevented from entering the cutout 5a of the pressing plate 5.

The other arm 9b of the lever 9 has an open elongated slot 9c which receives a pin 15 provided at the right-hand end of an output member here shown as a lever 12 which is rockable and reciprocable about the axis of a pivot pin 13 attached to the partition 7. The lever 12 has an elongated slot 12a which receives the pivot pin 13, and this lever is permanently biased by a helical spring 14 which urges its pin 15 away from the open end of the slot 9c, i.e., in a direction toward the socket 17. The direction in which the lever 12 is biased by the spring 14 is indicated by an arrow 16. The spring 10 tends to maintain the lever 12 in the retracted angular position which is shown in the drawing.

The operation is as follows:

When the user of the camera operates the lever 50 in a sense (arrow 50a) to advance the film 6 by a step in the direction indicated by arrow 11, the free end of the arm 9a enters an opening 6a of the film 6 and the lever 9 is caused to turn in a counterclockwise direction whereby the arm 9b rocks the lever 12 in a clockwise direction. During such rocking of the lever 12 about its pivot pin 13, the pin 15 penetrates deeper into the slot 9c of the arm 9b. At the same time, a front face 12b of the lever 12 engages one of the followers 20 and turns the socket 17 with the multiple flash bulb holder 18 in a counterclockwise direction against the opposition of the leaf spring 21. The latter assists the front face 12b and transmits to the socket 17 a torque as soon as the socket changes its angular position by little more than 45 degrees. The spring 21 then snaps back toward the vertical axis of the socket 17 and engages two followers 20 to maintain the socket in a position in which a fresh flash bulb 19 faces the subject.

The arm 9a is compelled to leave the adjoining opening 6a before the film transporting mechanism completes the advance of the film 6 by a step, so that the free end of the arm 9a then bears against a solid portion of the film. The spring 10 has stored energy during anticlockwise rotation of the lever 9 and tends to return the latter to the position which is shown in the drawing. In order to be able to turn in a clockwise direction, the lever 9 must move in the direction indicated by an arrow 22 whereby its pin 8 slides in the slot 7a of the partition 7 and travels in a direction away from the film path. It will be noted that the spring 10 biases the lever 9 in a clockwise direction and simultaneously urges the arm 9a in a direction toward the pressing plate 5. If desired, the spring 10 can be replaced by two springs one of which serves the sole purpose of biasing the lever 9 in a clockwise direction and the other of which tends to move the pin 8 toward the lower end of the slot 7a, as viewed in the drawing. During the next operation of the film transporting mechanism, the free end of the arm 9a enters the next-following opening 6a and causes the front face 12b of the lever 12 to index the socket 17 in order to place the next fresh flash bulb 19 into an optimum position for illumination of the subject.

When the lever 9 pivots in a clockwise direction under the action of its return spring 10, i.e., when the pin 8 travels in the direction indicated by the arrow 22, the arm 9b rocks the lever 12 in a counterclockwise direction whereby the inclined cam face 12c at the working end of the lever 12 engages the adjoining follower 20 and causes the lever 12 to slide along the pin 13 against the opposition of the spring 14. The bias of the leaf spring 21 is stronger than that of the spring 14 so that the lever 12 yields when its inclined cam face 12c engages a follower 20. The spring 14 contracts as soon as the cam face 12c moves beyond the adjoining follower 20 whereby the lever 12 moves in the direction indicated by arrow 16 and the just mentioned follower is engaged by the front face 12b so that the socket 17 can be indexed again as soon as the operator decides to turn the lever 50 in a sense to advance the film 6 in the direction indicated by arrow 11.

Of course, our camera is susceptible of many additional modifications without departing from the spirit of the present invention. For example, the motion transmitting or indexing unit between the film 6 and multiple flash bulb holder 18 can perform one or more additional functions. As shown, the top wall of the camera housing 1 can support a customary frame counter 51 and the lever 9 may be provided with an actuating element or second output member 9d which actuates the frame counter 51 whenever the arm 9a is caused to turn in a counterclockwise direction. It will be seen that, and if the lever 9 is to be considered as forming part of the frame counter 51, the motion transmitting or indexing unit of our invention merely comprises the lever 12 and spring 14 whereby the lever 12 constitutes an output member receiving motion from an input member 9 which is common to the motion transmitting unit and to the counter 51.

Furthermore, it is equally possible to simplify the construction of the motion transmitting or indexing unit by omitting the lever 12. The lever 9 is then mounted in such a way that its arm 9b constitutes an output member which can engage successive followers 20 of the socket 17 in order to index the latter in a clockwise direction, as viewed in the drawing. This will be readily understood by visualizing the lever 9 in a position closer to the socket 17. When the film 6 turns the arm 9a in a counterclockwise direction, the arm 9b engages the adjoining follower 20 and turns the socket 17 with the multiple flash bulb holder 18 in a clockwise direction. In such a modified camera, the slot 7a will be substantially parallel with the film path.

The followers 20 can be formed as integral parts of the socket 17, for example, by making the socket and its followers of a single piece of suitable plastic material. Since the lever 9 or an equivalent thereof is necessary anyway if the camera embodies a frame counter, the entire motion transmitting or indexing unit requires only two additional parts, namely, the lever 12 and its spring 14. Of course, and as mentioned before, the lever 12 can be omitted if the lever 9 is positioned to index the socket 17 through the intermediary of its arm 9b which then constitutes the output member of the indexing unit. Thus, the improved unit can be constructed and installed at a cost which is but a fraction of the cost involved in providing the socket 17 with a separate prime mover or of providing a motion transmitting connection between the lever 50 and the socket.

In accordance with a further modification of our invention, the lever 9 can cooperate with the aforementioned dual exposure preventing or blocking device 52 and with the frame counter 51 in such a way that it does not immediately return to its starting position when the operation of the film transporting mechanism is completed. The blocking device 52 which prevents dual exposures releases the lever 9 only upon depression of the shutter release. This is indicated in the drawing by two projections 53, 54 which are respectively provided on the blocking device 52 and arm 9b. When the lever 9 is pivoted by film 6 to its other end position, the projection 53 moves into the path of the projection 54 and prevents return movement of the lever 9 until after the completion of an exposure. The lever 9 or 12 is then preferably provided with a suitable index or marker 55 of distinctive color which registers with a window 56 in the top wall of the housing 1 only at the time when the lever 9 assumes its starting position which is actually shown in the drawing. The operator knows that the film transporting mechanism must be operated still further when the index 55 is in registry with the window 56. When the index 55 is visible, the operator also knows that the socket 17 must be indexed prior to making the next exposure with flash. Of course, the window 56 may be positioned in such a way that it registers with the index 55 when the camera is ready to make an exposure, or the top wall of the housing 1 may be provided with a second window which registers with the index 55 or with a second index when the lever 9 or 12 assumes its other end position.

Finally, the just mentioned index or marker 55 may be used with equal advantage in a camera wherein the return spring 10 for the lever 9 is omitted and wherein this lever is returned to the position which is shown in the drawing by the shutter release or by the blocking device 52. Such operative connection between the shutter release or between the device 52 and the lever 9 is not specifically shown in the drawing. For example, the blocking device 52 may be arranged to withdraw the arm 9a from an opening 6a in response to depression of the shutter release trigger and to thereupon compel the lever 9 to turn in a clockwise direction to reassume the position which is shown in the drawing.

It is also within the purview of our invention to utilize the improved motion transmitting or indexing unit for manipulation of a non-rotatable multiple flash bulb holder, for example, a holder which contains a row of two or more flash bulbs, as long as the input member of the motion transmitting unit derives motion from the film and its output member is capable of changing the position of the multiple flash bulb holder in order to place the next unused flash bulb into an optimum position for illumination of the subject in response to operation of the film transporting mechanism.

A dual exposure preventing or blocking device which can be utilized in our camera is disclosed, for example, in the copending application Ser. No. 442,717, filed Mar. 25, 1965 by Schröder et al., now Pat. No. 3,334,562, and assigned to the same assignee.

Without further analysis, the foregoing will so fully reveal the gist of the present invention that others can, by applying current knowledge, readily adapt it for various applications without omitting features which fairly constitute essential characteristics of the generic and specific aspects of our contribution to the art.

What is claimed as new and desired to be protected by Letters Patent is set forth in the appended claims:

1. In a camera having a housing and a film transporting mechanism mounted in the housing and operative to advance the film stepwise in a predetermined path, the combination of a multiple flash bulb holder carried by said housing for movement between a plurality of positions in each of which a different flash bulb therein assumes a predetermined position with reference to the housing; and motion transmitting means provided in the housing for moving said holder between successive positions in response to operation of the film transporting mechanism, said motion transmitting means including an input member arranged to receive motion directly from the film while the film advances in response to operation of the film transporting mechanism.

2. A combination as defined in claim 1, wherein said input member forms part of a lever which is pivotably mounted in said housing.

3. A combination as defined in claim 1, further comprising a socket for said holder, said socket being movably supported by said housing and including a series of followers, one for each of the flash bulbs in said holder, said motion transmitting means further comprising an output member movable into engagement with successive followers in response to displacement of said input member during successive operations of the film transporting mechanism.

4. A combination as defined in claim 3, wherein said output member is movable by said input member from a retracted position to an extended position and wherein said motion transmitting means further comprises biasing means for permanently urging said output member to retracted position.

5. A combination as defined in claim 1, further comprising a socket for said holder, said socket being rotaable in said housing and comprising a series of equidistant followers, one for each of the flash bulbs in said holder, said motion transmitting means further comprising an output member movable by said input member into engagement with successive followers to rotate said socket and said holder through angles of identical magnitude in response to successive operations of the film transporting mechanism.

6. A combination as defined in claim 1, wherein said input member forms part of a lever and is constituted by an arm engageable with the film in said film path, and further comprising fulcrum means providing a reciprocatory pivot axis for said lever.

7. A combination as defined in claim 6, wherein said fulcrum means comprises a pin provided on said lever and extending into an elongated slot of said housing.

8. A combination as defined in claim 1, further comprising a socket for said holder, said socket being rotatable in said housing about a fixed axis and comprising a series of equidistant followers, one for each of the flash bulbs in said holder, said input member forming part of a two-armed lever rockably mounted in said housing, said lever having a first arm engageable with the film in said film path and constituting said input member and a second arm, said motion transmitting means further comprising a second lever receiving motion from said second arm and arranged to rotate said socket through the intermediary of successive followers in response to successive operations of the film transporting mechanism.

9. A combination as defined in claim 1, further comprising a socket for said holder, said socket being rotatable in said housing about a fixed axis and comprising a series of equidistant followers, one for each flash bulb in said holder, said motion transmitting means further comprising an output member engageable with successive followers to turn said socket through angles of identical magnitude in response to motion received from said input member during successive operations of the film transporting mechanism.

10. A combination as defined in claim 1, further comprising a frame counter and an operative connection between said motion transmitting means and said frame counter.

11. A combination as defined in claim 1, further comprising index means provided on said motion transmitting means to indicate the position of said input member.

12. A combination as defined in claim 11, wherein said housing is provided with a window and said index means is in registry with said window in a predetermined position of said input member.

13. A combination as defined in claim 11, further comprising dual exposure preventing means operative to arrest said input member in response to completed operation of said film transporting mechanism.

14. In a camera having a housing and a film transporting mechanism mounted in the housing and operative to advance the film stepwise in a predetermined path, the combination of a multiple flash bulb holder carried by the housing for movement between a plurality of positions in each of which a different flash bulb therein assumes a predetermined position with reference to the housing; motion transmitting means provided in the housing for moving said holder between successive positions in response to operation of the film transporting mechanism, said motion transmitting means including an input member arranged to receive motion directly from the film while the film advances in response to operation of the film transporting mechanism; and a socket for said holder, said socket being rotatable in the housing about a fixed axis and comprising a series of equidistant followers, one for each of the flash bulbs in said holder, said input member forming part of a two-armed lever rockably mounted in said housing and having a first arm engageable with the film in said film path and constituting said input member and a second arm, said motion transmitting means further comprising a second lever receiving motion from said second arm and arranged to rotate said socket through the intermediary of successive followers in response to successive operations of the film transporting mechanism, said second lever being pivotable and reciprocable with reference to the housing and said motion transmitting means further comprising a pin-and-slot connection between the second arm of said first mentioned lever and said second lever.

15. A combination as defined in claim 14, wherein said second lever is provided with an elongated slot and said motion transmitting means further comprises a pin carried by said housing and extending into said elongated slot and biasing means for permanently urging said second lever away from said socket.

16. In a camera having a housing and a film transporting mechanism mounted in the housing and operative to advance the film stepwise in a predetermined direction, the combination of a multiple flash bulb holder carried by the housing for movement between a plurality of positions in each of which a different flash bulb therein assumes a predetermined position with reference to the housing; motion transmitting means provided in the housing for moving said holder between successive positions in response to operation of the film transporting mechanism, said motion transmitting means including an input member arranged to receive motion directly from the film while the film advances in response to operation of the film transporting mechanism; and a socket for said holder, said socket being rotatable in the housing about a fixed axis and comprising a series of equidistant followers, one for each flash bulb in said holder, said motion transmitting means further comprising an output member engageable with successive followers to turn said socket through angles of identical magnitude in response to motion received from said input member during successive operations of the film transporting mechanism, said output member being movable with reference to said input member and being provided with a motion transmitting face engaging with successive followers during successive operations of said mechanism and a cam face for moving it with reference to said input member during return movement of said output member to a retracted position in response to the action of biasing means connected with one of said members to oppose displacement of said input member by moving film.

References Cited

UNITED STATES PATENTS

| | | | |
|---|---|---|---|
| 3,009,406 | 11/1961 | Takahama | 95—31 |
| 3,148,605 | 9/1964 | Peterson et al. | 95—31 |
| 3,334,562 | 8/1967 | Schroder et al. | 95—31 |
| 3,354,300 | 11/1967 | Parsons et al. | 240—1.3 |

NORTON ANSHER, Primary Examiner

F. L. BRAUN, Assistant Examiner

U.S. Cl. X.R.

95—31; 240—31